(12) United States Patent
Hong

(10) Patent No.: US 6,644,578 B2
(45) Date of Patent: Nov. 11, 2003

(54) FISHING REEL WITH A BAIL ARM UNIT

(76) Inventor: Eugene Hong, 11F-6, No. 333, Sec. 2, Hua-Mei W. St., Hsi-Tun Dist., Taichung City (TW)

( * ) Notice: Subject to any disclaimer, the term of this patent is extended or adjusted under 35 U.S.C. 154(b) by 0 days.

(21) Appl. No.: 10/073,354

(22) Filed: Feb. 13, 2002

(65) Prior Publication Data

US 2003/0150944 A1 Aug. 14, 2003

(51) Int. Cl.$^7$ ............................................. A01K 89/01
(52) U.S. Cl. ....................................... 242/231; 242/232
(58) Field of Search ................................. 242/231, 232

(56) References Cited

U.S. PATENT DOCUMENTS

| | | | | |
|---|---|---|---|---|
| 5,683,049 A | * | 11/1997 | Kawabe et al. | 242/232 |
| 5,813,620 A | * | 9/1998 | Yamaguchi et al. | 242/232 |
| 5,988,546 A | * | 11/1999 | Young | 242/232 |
| 6,050,511 A | * | 4/2000 | Katayama et al. | 242/231 |
| 6,176,447 B1 | * | 1/2001 | Yamaguchi et al. | 242/322 |

* cited by examiner

Primary Examiner—Kathy Matecki
Assistant Examiner—Evan Langdon
(74) Attorney, Agent, or Firm—Morgan Lewis & Bockius LLP

(57) ABSTRACT

A fishing reel includes a rotating wheel unit rotatable on a main body about a rotating axis, and a bail arm unit. The rotating wheel unit has two U-shaped bail-supporting portions, each of which is formed with two parallel inner surfaces that define a socket therebetween and that are parallel to the rotating axis. The bail arm unit includes two support members, each of which has a base portion and a connecting head portion, and a bail arm member for interconnecting the connecting head portions. The base portions of the support members are disposed respectively and pivotally within the sockets in the rotating wheel unit. Each of the base portions has two opposite side surfaces that are parallel to and that abut respectively against the inner surfaces of the corresponding bail-supporting portion.

3 Claims, 10 Drawing Sheets

FISHING REEL WITH A BAIL ARM UNIT

BACKGROUND OF THE INVENTION

1. Field of the Invention

This invention relates to a fishing reel, and more particularly to a fishing reel, which includes a bail arm unit that serves to guide winding of a fishline around a spool.

2. Description of the Related Art

Referring to FIG. 1, a conventional spinning-type fishing reel is shown to include a main body 1, a rotating wheel unit 2 that is disposed rotatably on the main body 1, a spool 3 that is disposed movably on the main body 1, a bail arm unit 4 that is disposed rotatably on the rotating wheel unit 2, and a positioning spring unit 5 for biasing the bail arm unit 4 to a throwing position and a winding position. The main body 1 includes a positioning rod 101, and a handle 102 that is disposed rotatably on the positioning rod 101. When the handle 102 is actuated, the rotating wheel unit 2 rotates about a rotating axis (L1), and the spool 3 reciprocates relative to the main body 1. The rotating wheel unit 2 includes a cylindrical body 201, and two bail-supporting portions 202 that are disposed respectively and fixedly on two opposite sides of the body 201. Each of the bail-supporting portions 202 has an accommodating space 203 that is defined within a surrounding wall 204 and that has a flat bottom wall 205, a cap 206 that is mounted sealingly on the surrounding wall 204, and an internally threaded post 207 that extends integrally from the bottom wall 205. The bail arm unit 4 includes two support members 401 that are connected respectively to the bail-supporting portions 202 of the rotating wheel unit 2, a bail arm member 402, and two bolts 403. Each of the support members 401 has a base portion 404 that is connected rotatably to the respective post 207 so as to permit rotation of the base portion 404 about the axis (L2) of the bolts 403, which is perpendicular to the rotating axis (L1), and a connecting head portion 405. The bail arm member 402 interconnects the connecting head portions 405 of the support members 401. The positioning spring unit 5 is disposed within the accommodating space 203 in one of the bail-supporting portions 202, and includes a spring 501, and a fastening piece 502 for connecting the spring 501 to the base portion 404 of the corresponding support member 401. As such, gaps (I) are formed between the caps 206 and the base portions 404 of the support members 401. When a fishline is wound around the spool 3, it may slip into the gaps (I), thereby hindering smooth winding operation of the fishing reel.

SUMMARY OF THE INVENTION

The object of this invention is to provide a fishing reel, which can prevent movement of a fishline into any gap formed between a bail arm unit and a rotating wheel unit during winding operation of the fishing reel.

According to this invention, a fishing reel includes a rotating wheel unit rotatable on a main body about a rotating axis, and a bail arm unit. The rotating wheel unit has two U-shaped bail-supporting portions, each of which is formed with two parallel inner surfaces that define a socket therebetween and that are parallel to the rotating axis. The bail arm unit includes two support members, each of which has a base portion and a connecting head portion, and a bail arm member for interconnecting the connecting head portions. The base portions of the support members are disposed respectively and pivotally within the sockets in the rotating wheel unit. Each of the base portions has two opposite side surfaces that are parallel to and that abut respectively against the inner surfaces of the corresponding bail-supporting portion. Because the side surfaces of the support members and the inner surfaces of the rotating wheel unit are parallel to the rotating axis, a fishline can be prevented from moving into gaps formed between the inner surfaces and the side surfaces during winding operation of the fishing reel.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
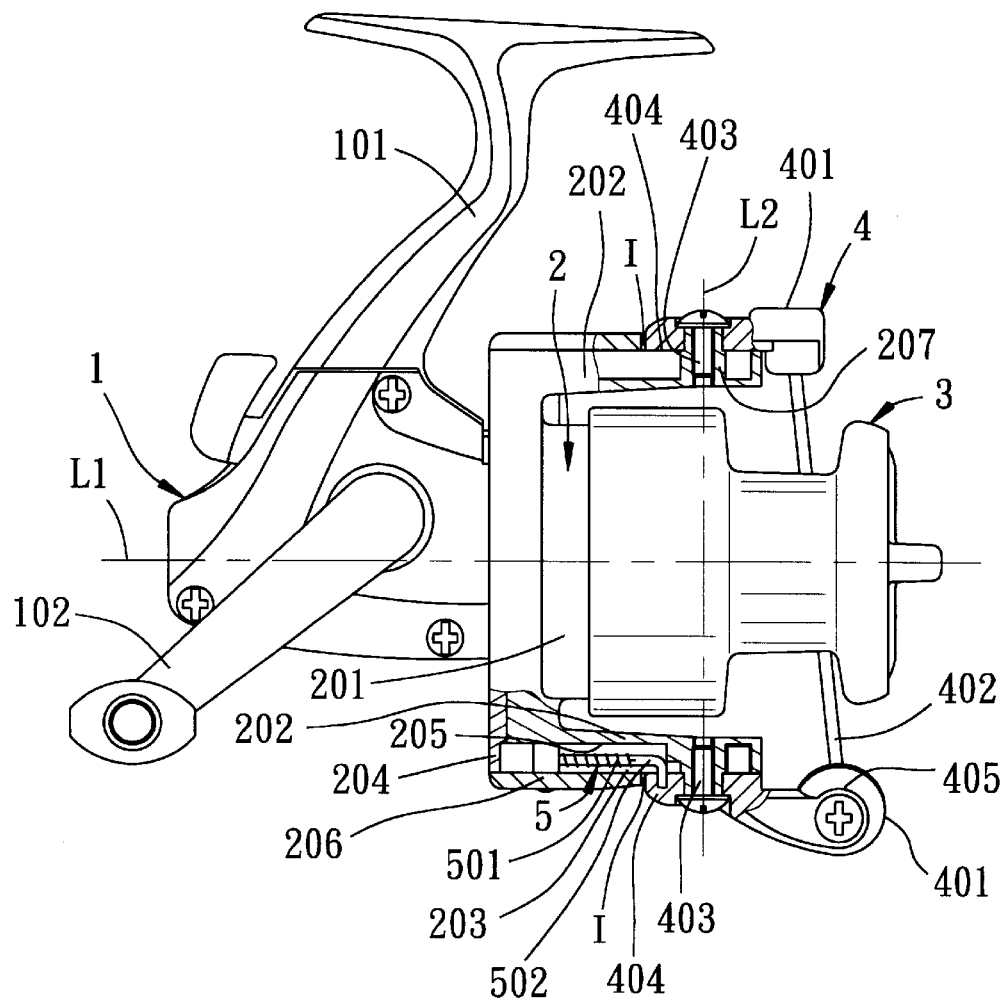
FIG. 1 is a partly sectional, schematic side view of a conventional spinning-type fishing reel.
Figure 2:
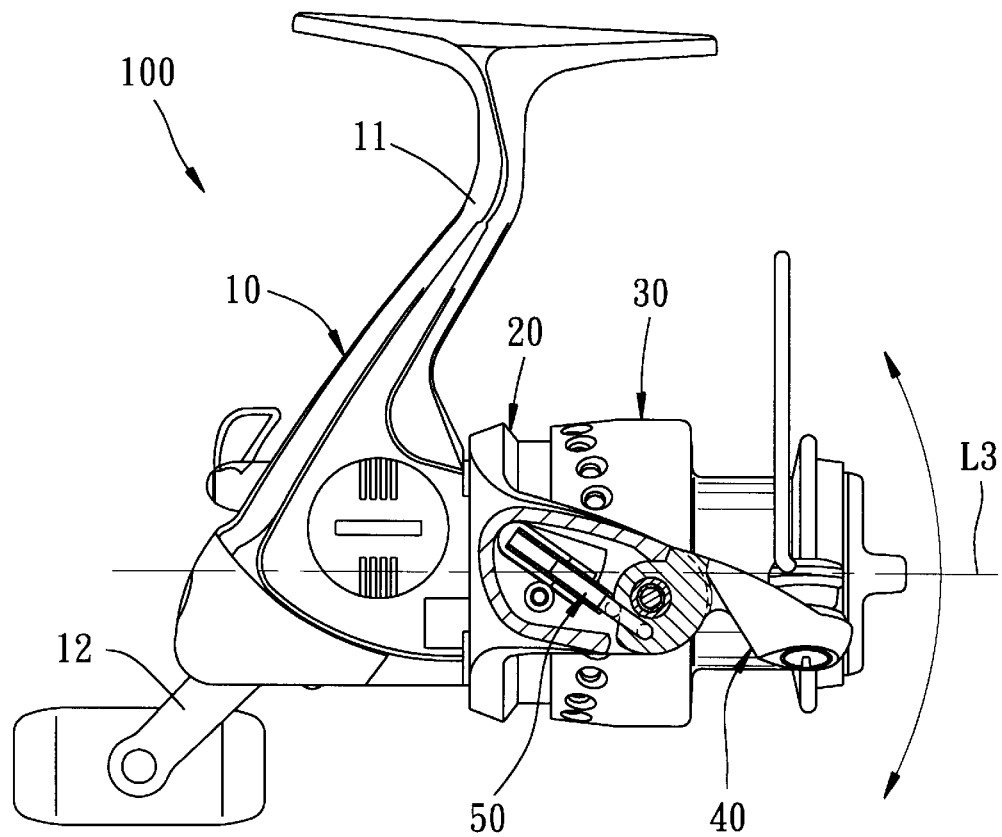
FIG. 2 is a partly sectional, schematic side view of the preferred embodiment of a fishing reel according to this invention.
Figure 3:
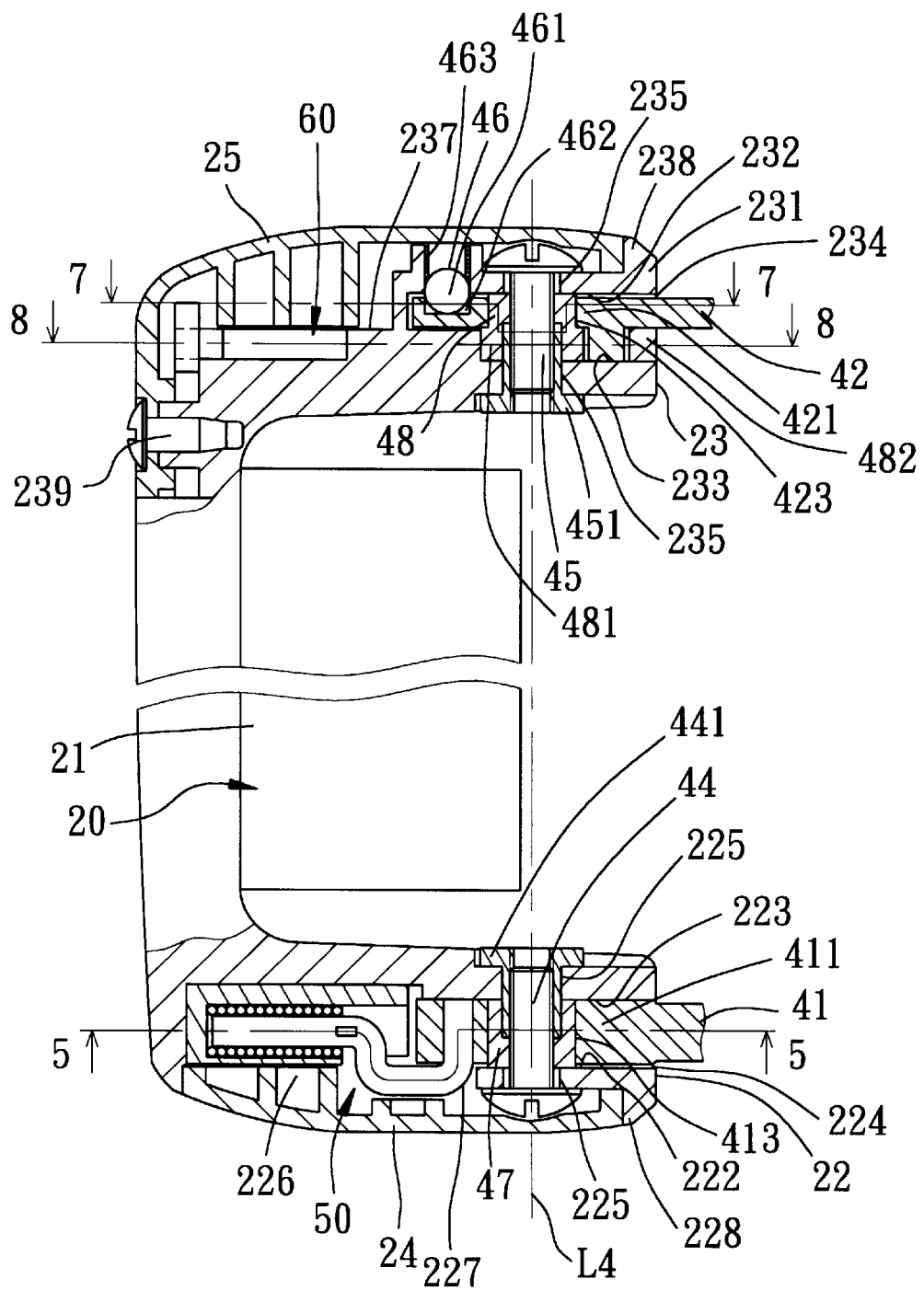
FIG. 3 is a partly sectional, fragmentary schematic top view of the preferred embodiment, illustrating how a bail arm unit, a positioning spring unit, and a push unit are disposed on a rotating wheel unit.
Figure 3A:
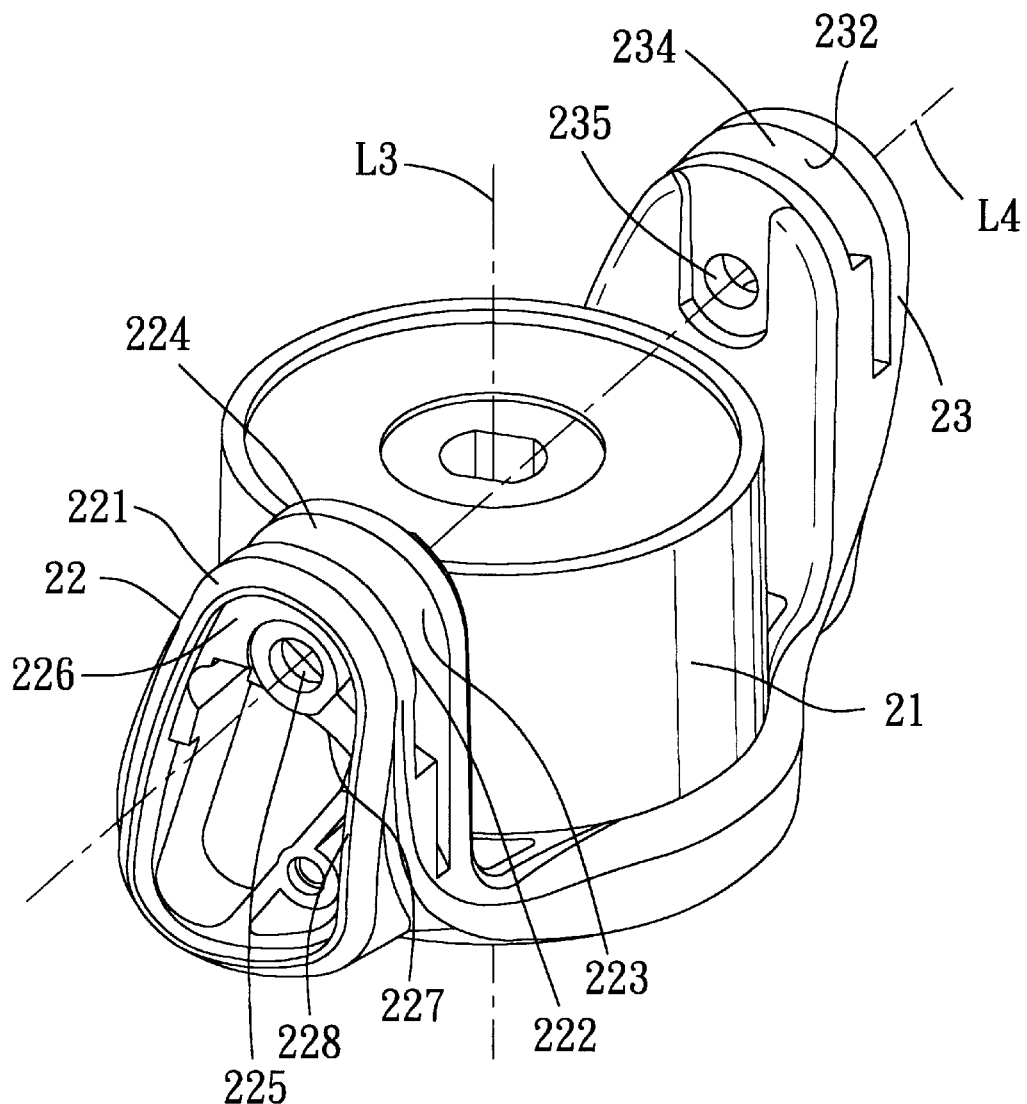
FIG. 3A is a perspective view of the rotating wheel unit of the preferred embodiment.
Figure 4:
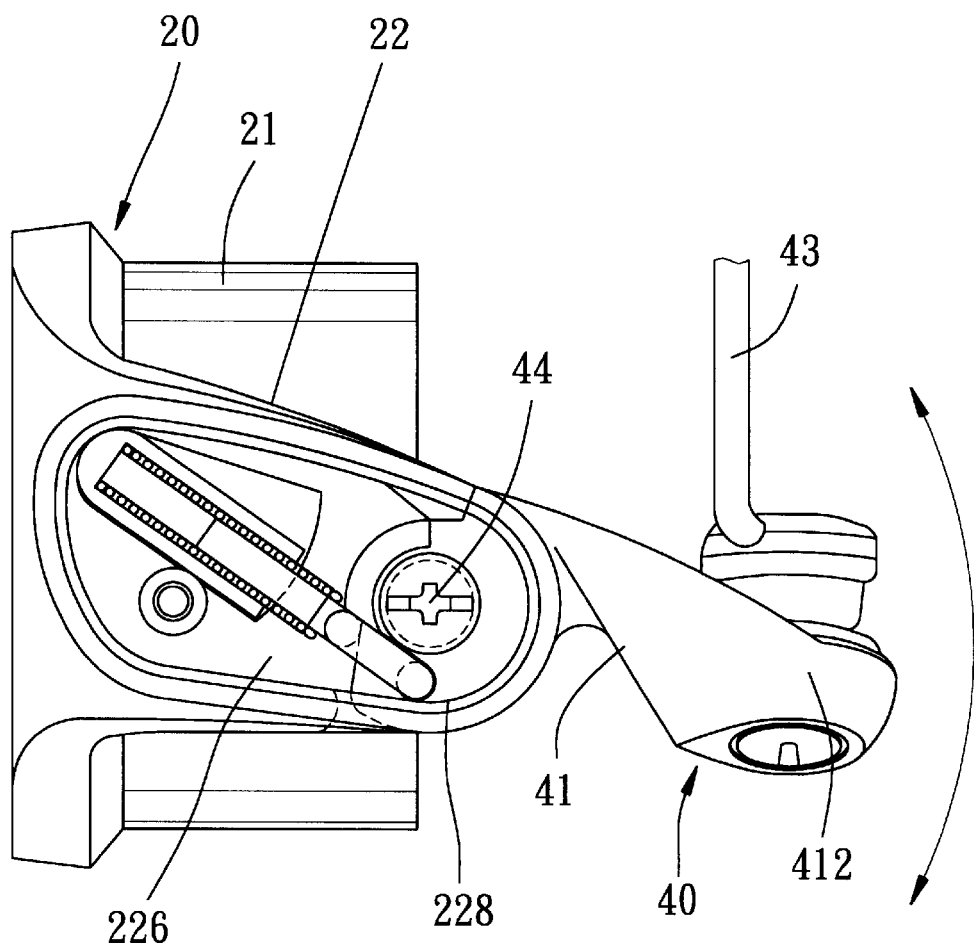
FIG. 4 is a fragmentary schematic side view of the preferred embodiment, in which a first cap is removed from a first bail-supporting portion of the rotating wheel unit so as to illustrate the structure of the positioning spring unit.

Referring to FIGS. 2, 3, and 3A, the preferred embodiment of a fishing reel 100 according to this invention is shown to include a main body 10, a rotating wheel unit 20, as pool 30, a bail arm unit 40, a positioning spring unit 50, and a push unit 60.

The main body 10 includes a positioning rod 11 that is mounted on a fishing rod (not shown), and a handle 12 that is disposed rotatably relative to the positioning rod 11.

The rotating wheel unit 20 is disposed rotatably on the main body 10 in a known manner, is rotatable about a rotating axis (L3), and includes a cylindrical body 21, and a pair of first and second bail-supporting portions 22, 23 that are disposed respectively and fixedly on two opposite sides of the cylindrical body 21.

The first bail-supporting portion 22 is generally U-shaped, and has two side walls 221, which are formed respectively with two parallel inner surfaces 222, 223 that define a socket 224 therebetween. Each of the side walls 221 has a pivot hole 225. The second bail-supporting portion 23 is also generally U-shaped, and has two side walls 231, which are formed respectively with two parallel inner surfaces 232, 233 that define a socket 234 therebetween. Each of the side walls 231 has a pivot hole 235.

The spool 30 is disposed movably on the main body 10 in a known manner, and is movable relative to the rotating wheel unit 20 in an axial direction of the spool 30. When the handle 12 is actuated, the rotating wheel unit 20 rotates on the main body 10, and the spool 30 reciprocates on the main body 10 for winding or unwinding of a fishline.

The bail arm unit 40 includes a first support member 41, a second support member 42, a bail arm member 43, a first pivot pin 44, a second pivot pin 45 that is aligned with the first pivot pin 44, a sound-generating unit 46, a first bushing 47, and a second bushing 48.

The first support member 41 has a base portion 411 and a connecting head portion 412. The base portion 411 engages fittingly the socket 224 in the first bail-supporting portion 22 of the rotating wheel unit 20, and has a pivot hole 413 formed therethrough, and two opposite side surfaces that abut respectively against the inner surfaces 222, 223 of the first bail-supporting portion 22. The first bushing 47 is inserted into the pivot hole 413 in the first support member 41. The first pivot pin 44 is configured as a bolt, and extends through the pivot holes 225 in the first bail-supporting portion 22 of the rotating wheel unit 20 and further through the first bushing 47 to engage a nut 441 so as to permit rotation of the first support member 41 about the axis (L4) of the first pivot pin 44.

The second support member 42 also has a base portion 421 and a connecting head portion 422. The base portion 421 engages fittingly the socket 234 in the second bail-supporting portion 23 of the rotating wheel unit 20, and has a pivot hole 423 formed therethrough, and two opposite side surfaces that abut respectively against the inner surfaces 232, 233 of the second bail-supporting portion 23. The second bushing 48 is inserted into the pivot hole 423 in the second support member 42. The second pivot pin 45 is configured as a bolt, and extends through the pivot holes 235 in the second bail-supporting portion 23 of the rotating wheel unit 20 and further through the second bushing 48 to engage a nut 451 so as to permit rotation of the second support member 42 about the axis (L4) of the second pivot pin 45.

Figure 5:
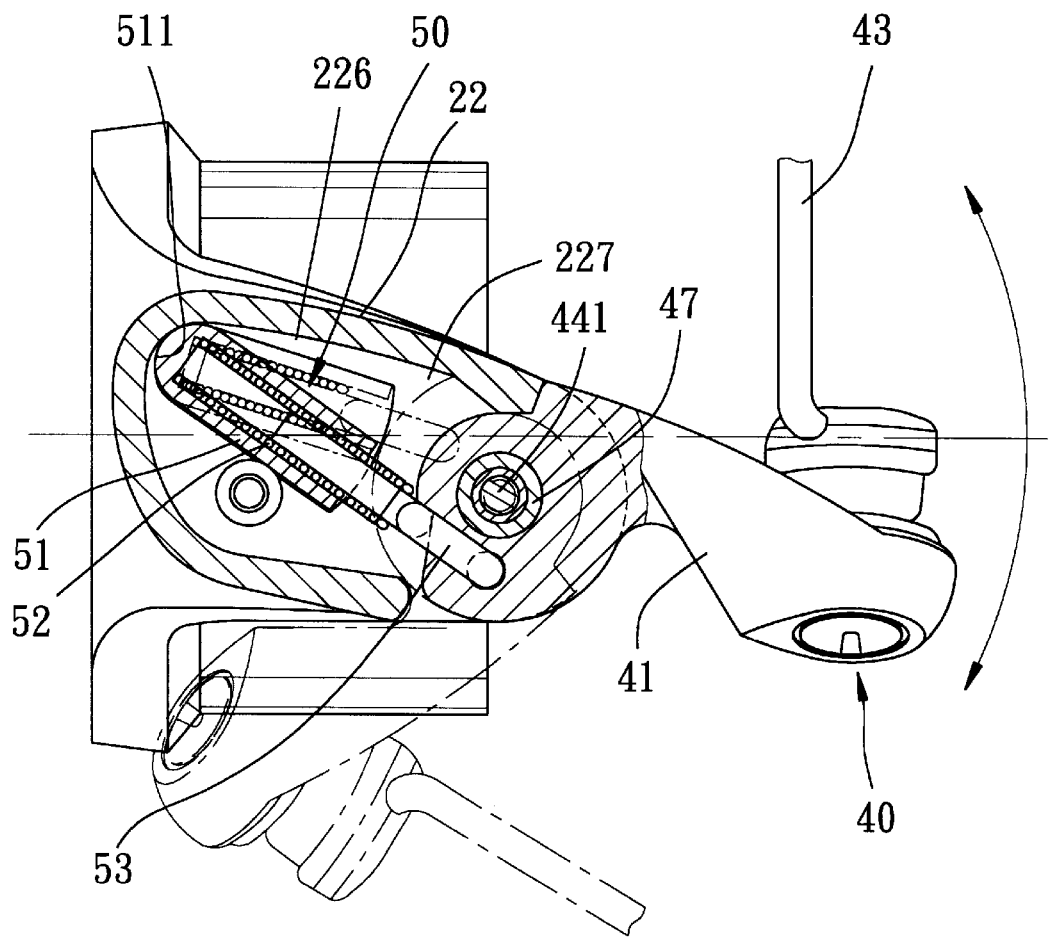
FIG. 5 is a sectional view of the preferred embodiment, taken along Line 5—5 in FIG. 3.
Figure 6:
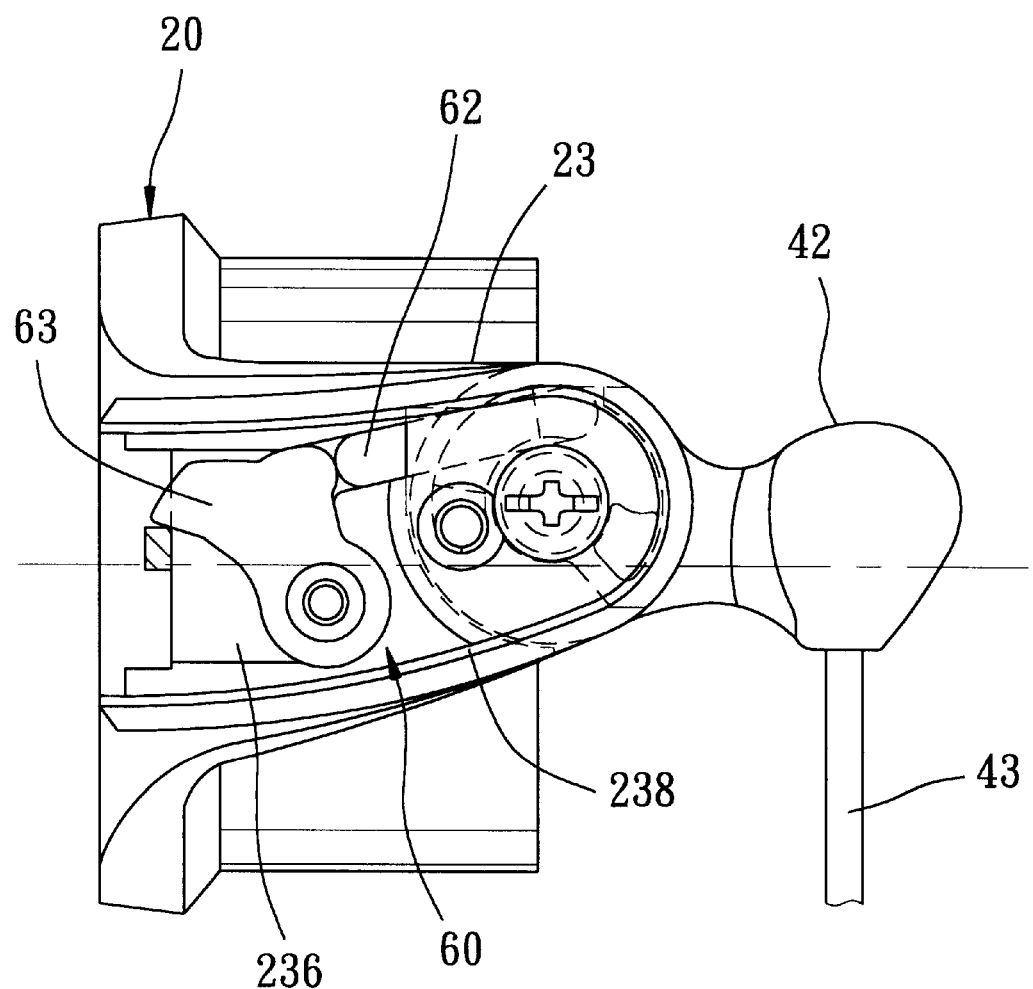
FIG. 6 is a fragmentary schematic side view of the preferred embodiment, in which a second cap is removed from a second bail-supporting portion of the rotating wheel unit so as to illustrate the structure of the push unit.
Figure 7:
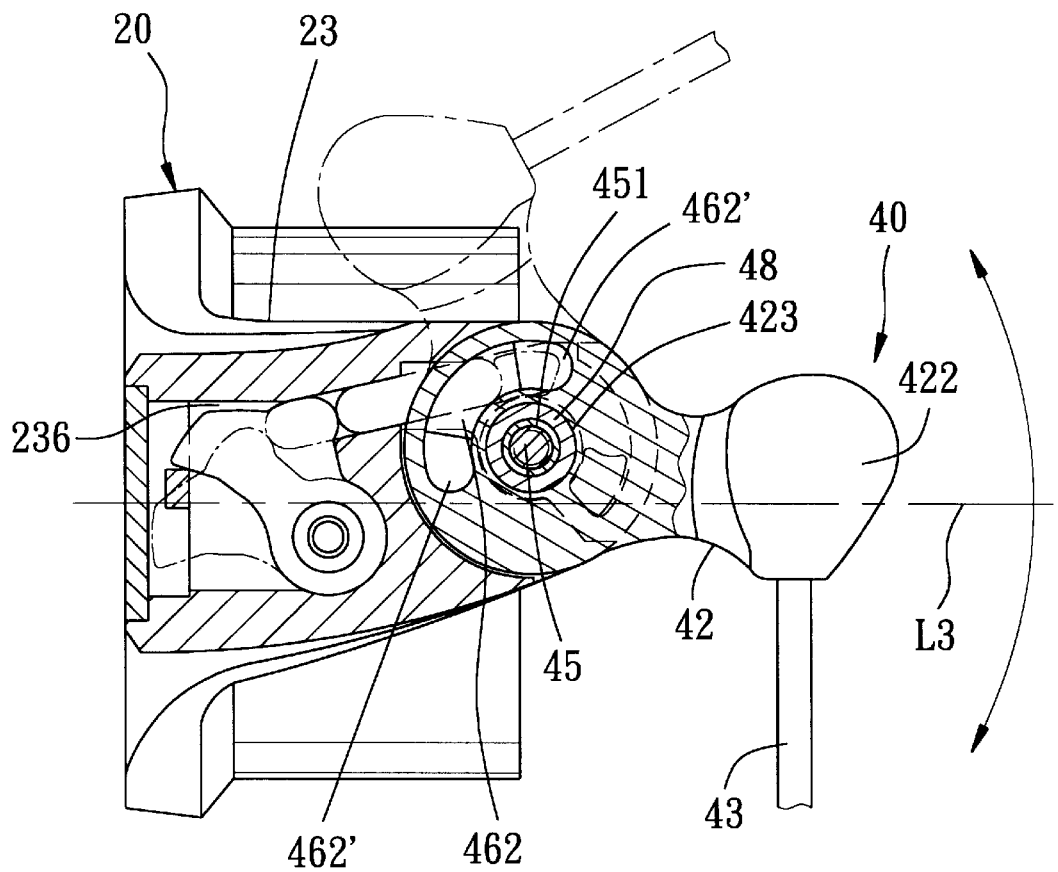
FIG. 7 is a sectional view of the preferred embodiment, taken along Line 7—7 in FIG. 3.

The bail arm member 43 has two ends that are connected respectively to the connecting head portions 412, 422 of the first and second support members 41, 42, and is rotatable between a throwing position shown by phantom lines in FIGS. 5 and 7, where the fishline is permitted to unwind from the spool 30, and a winding position shown by solid lines in FIGS. 3, 4, 5, 6, and 7, where the fish line can be guided to wind around the spool 30.

The sound-generating unit 46 includes a ball 461, a circumferentially extending slide slot 462, and a coiled compression spring 463. The slide slot 462 is formed in one of the side surfaces of the second support member 42, and has two closed ends 462' (see FIG. 7) that are deeper than the remainder of the slide slot 462 so that a sound can be generated when the ball 461 moves into each end 462' of the slide slot 462. The ball 461 is confined within the inner surface 232 of the second bail-supporting portion 23 of the rotating wheel unit 20, and is biased by the spring 463 into the slide slot 462. When the bail arm member 43 is disposed at the throwing position, the ball 461 is located at one end 462' of the slide slot 462. When the bail arm member 43 is disposed at the winding position, the ball 461 is located at the other end 462' of the slide slot 462.

Figure 8:
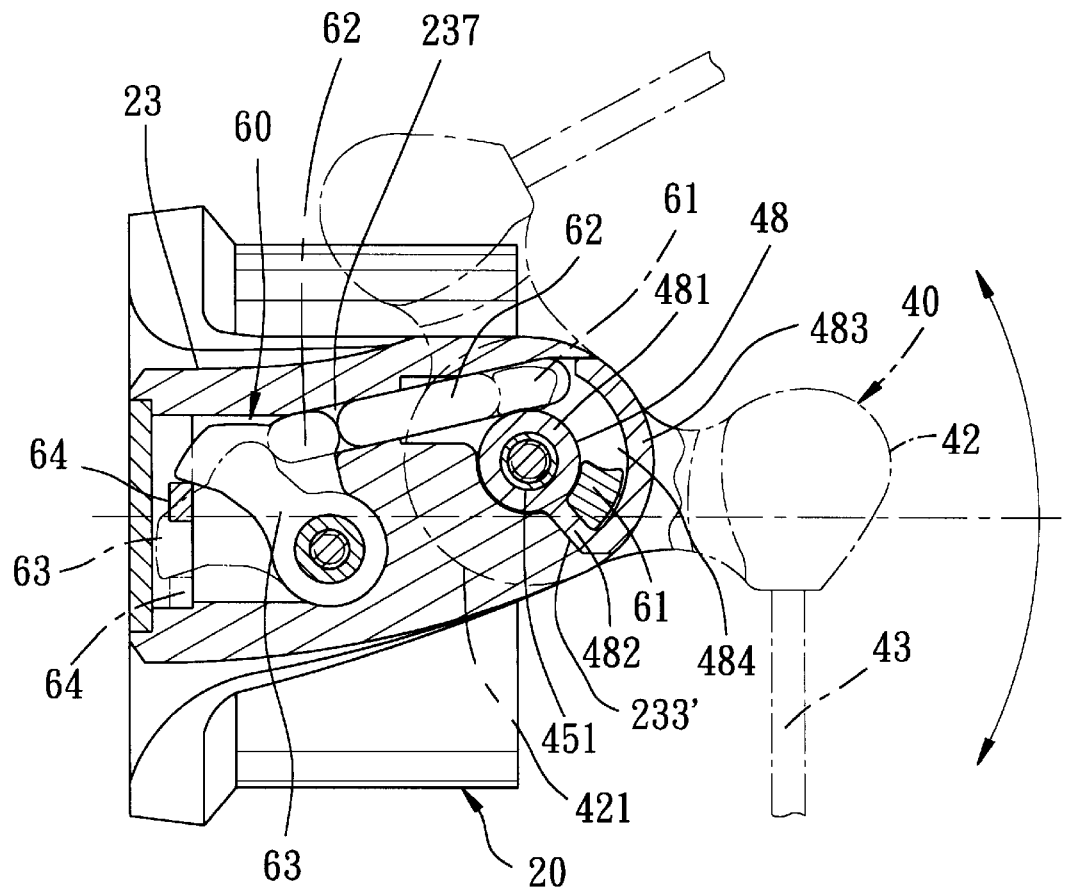
FIG. 8 is a sectional view of the preferred embodiment, taken along Line 8—8 in FIG. 3.

Referring to FIGS. 3 and 8, the second bushing 48 includes a cylindrical bushing body 481 and a positioning arm that has an elongated radial arm portion 482 and an elongated circumferential arm portion 483. The bushing body 481 is disposed within the pivot hole 423 in the base portion 421 of the second support member 42, and is sleeved rotatably on the second pivot pin 45. The positioning arm is received fittingly within a recess 233' in the second bail-supporting portion 23 so as to be fixed relative to the rotating wheel unit 20. The radial arm portion 482 has an inner end that is formed integrally with the bushing body 481, and an outer end that is formed integrally with an end of the circumferential arm portion 483. As such, a limiting slot 484 is defined among the bushing body 481, the radial arm portion 482, and the circumferential arm portion 483. The base portion 421 of the second support member 42 is formed integrally with a positioning tongue 61 that extends axially therefrom and that is received slidably within the limiting slot 484 in the second bushing 48. When the bail arm member 43 is disposed at the winding position, the positioning tongue 61 abuts against the radial arm portion 482, as shown in FIG. 8, thereby positioning the second support member 42 relative to the rotating wheel unit 20.

Referring to FIGS. 3, 3A, 4, and 5, the first bail-supporting portion 22 of the rotating wheel unit 20 includes an accommodating space 226, an opening 227 that is communicated with the accommodating space 226, and an annular flange 228 that defines the opening 227 therein. A first cap 24 is press fitted within the flange 228.

The positioning spring unit 50 is disposed within the accommodating space 226 in the first bail-supporting portion 22 of the rotating wheel unit 20, and includes a sleeve 51 that is disposed pivotally within the accommodating space 226 at an end 511, a spring 52 mounted within the sleeve 51, and a fastening piece 53 that interconnects the spring 52 and the first support member 41 in a known manner so as to bias the bail arm member 43 to the throwing position and the winding position. As such, the bail arm member 43 is rotatable forcibly between the throwing position and the winding position.

Referring to FIGS. 3, 6, 8, and 9, the second bail-supporting portion 23 of the rotating wheel unit 20 has an accommodating space 236, an opening 237 that is communicated with the accommodating space 236, and a U-shaped flange 238 that defines the opening 237. A second cap 25 is connected removably to the flange 238 by a bolt 239.

The push unit 60 is disposed within the accommodating space 236 in the second bail-supporting portion 23 of the rotating wheel unit 20, and is connected operably to the positioning tongue 61 of the base portion 421 in a known manner. The push unit 60 includes a push rod 62, a crank member 63, and a push member 64. The push rod 62 is guided to move along a straight path in the accommodating space 236. The crank member 63 and the push member 64 are disposed rotatably in the accommodating space 236, and have rotating axes that are perpendicular to each other. Because the specific structure of the push unit 60 is known in the art and is not pertinent to the claimed invention, a detailed description thereof will be omitted herein for the sake of brevity.

Referring to FIG. 8, when it is desired to throw the fishline away from the fishing reel 100 (see FIG. 2), the bail arm member 43 is turned upward from the winding position to the throwing position so that the positioning tongue 61 rotates counterclockwise, thereby pushing the push rod 62 to the left. Subsequently, the push rod 62 rotates the crank member 63 so as to turn a pushing arm 641 of the push member 64 to a position shown by phantom lines in FIG. 9, where the pushing arm 641 projects from the rotating wheel unit 20. After completing the fish line throwing operation, the handle 12 (see FIG. 2) can be actuated to rotate the rotating wheel unit 20.

Figure 9:
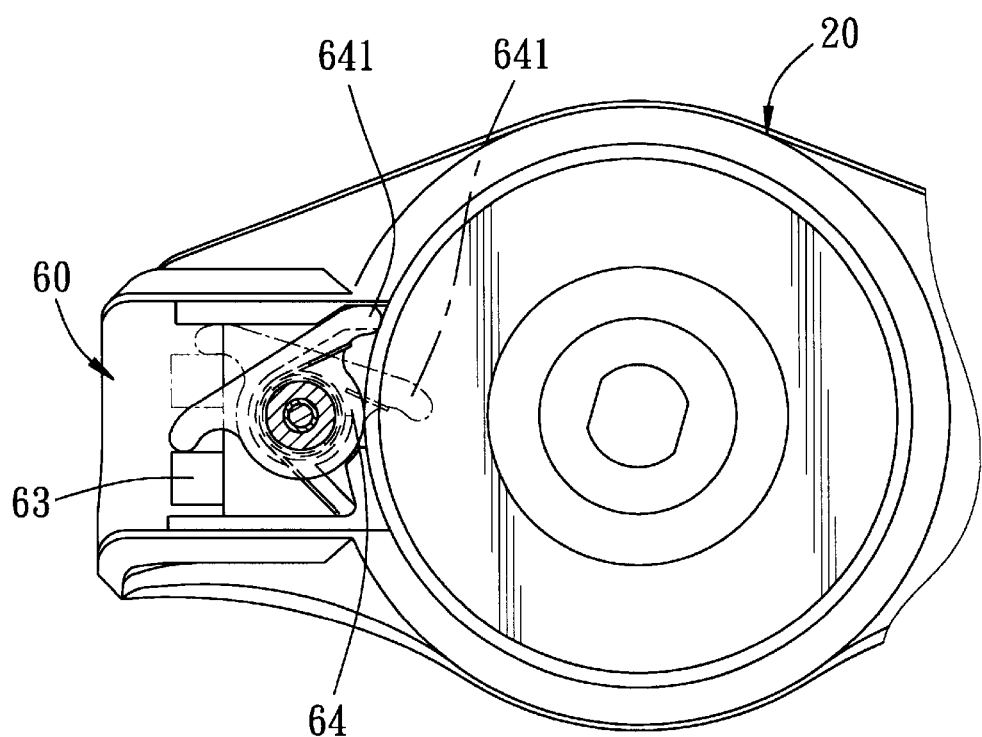
FIG. 9 is a schematic top view, illustrating the operation of the push unit of the preferred embodiment.

Referring to FIG. 9, when the pushing arm 641 rotates synchronously with the rotating wheel unit 20, it is brought into contact with the main body 10 (see FIG. 2) so as to rotate counterclockwise to turn the crank member 63. Subsequently, referring to FIG. 8, the crank member 63 will move the push rod 62 to the right so as to rotate the positioning tongue 61 clockwise, thereby turning downward the bail arm member 43 to the winding position.

Referring to FIG. 3, it can be appreciated that the fishline can be prevented from moving into gaps formed between the inner surfaces 222, 223, 232, 233 of the first and second bail-supporting portions 22, 23 of the rotating wheel unit 20 and the side surfaces of the first and second support members 41, 42 during winding operation of the fishing reel in view of the condition that the inner surfaces 222, 223, 232, 233 are perpendicular to the aligned axes (L4) of the first and second pivot pins 44, 45.

With this invention thus explained, it is apparent that numerous modifications and variations can be made without departing the scope and spirit of this invention. It is therefore intended that this invention be limited only as indicated by the appended claims.

I claim:

1. A fishing reel comprising:

a main body;

a rotating wheel unit disposed rotatably on said main body and rotatable about a rotating axis, said rotating wheel unit including a cylindrical body, and a pair of U-shaped first and second bail-supporting portions disposed respectively and fixedly on two opposite sides of said cylindrical body, each of said first and second bail-supporting portions having two side walls, which are formed respectively with two parallel inner surfaces that define a socket therebetween, each of said side walls having a pivot hole;

a spool disposed movably on said main body and movable relative to said rotating wheel unit in an axial direction of said spool, said spool being adapted to permit winding of a fishline thereon;

a bail arm unit disposed on said rotating wheel unit and including a first support member having a connecting head portion and a base portion, which engages fittingly said socket in said first bail-supporting portion of said rotating wheel unit and which has two opposite side surfaces that abut respectively against said inner surfaces of said first bail-supporting portion of said rotating wheel unit, and a pivot hole formed therethrough, a first pivot pin extending through said pivot holes in said first bail-supporting portion of said rotating wheel unit and said pivot hole in said first support member in a direction that is perpendicular to said inner surfaces of said first and second bail-supporting portions of said rotating wheel unit so that said first support member is rotatable about said first pivot pin, a second support member having a connecting head portion and a base portion, which engages fittingly said socket in said second bail-supporting portion of said rotating wheel unit and which has two opposite side surfaces that abut respectively against said inner surfaces of said second bail-supporting portion of said rotating wheel unit, and a pivot hole formed therethrough, a second pivot pin extending through said pivot holes in said second bail-supporting portion of said rotating wheel and said pivot hole in said second support member and aligned with said first pivot pin so that said second support member is rotatable about said second pivot pin, and a bail arm member for interconnecting said connecting head portions of said first and second support members, said bail arm member being rotatable about said first and second pivot pins between a throwing position, where the fishline is permitted to unwind from said spool, and a winding position, where the fishline can be guided to wind around said spool;

a positioning spring unit for biasing said bail arm member to said throwing position and said winding position; and a push unit disposed on said rotating wheel unit and connected to said bail arm unit so as to move said bail arm member from said throwing position to said winding position when said bail arm member is disposed at said throwing position and when said rotating wheel unit rotates, a bushing, which includes:

a cylindrical bushing body disposed within said pivot hole in said base portion of said second support member and sleeved rotatably on said second pivot pin; and a positioning arm fixed relative to said rotating wheel unit and having an elongated radial arm portion and an elongated circumferential arm portion, said radial arm portion having an inner end that is formed integrally with said bushing body, and an outer end that is formed integrally with an end of said circumferential arm portion so as to define a limiting slot among said bushing body, said radial arm portion, and said circumferential arm portion;

said base portion of said second support member being formed integrally with a positioning tongue that extends axially therefrom and that is received slidably within said limiting slot in said bushing, said positioning tongue abutting against said radial arm portion when said bail arm member is disposed at said winding position, thereby positioning said second support member relative to said rotating wheel unit.

2. The fishing reel as claimed in claim 1, further comprising a sound generating unit, which includes:

a circumferentially extending slide slot formed in one of said side surfaces of said second support member and having two closed ends that are deeper than remainder of said slide slot; and a spring-biased ball confined within one of said inner surfaces of said second bail-supporting portion of said rotating wheel unit and disposed slidably within said slide slot, said ball being located at one of said ends of said slide slot when said bail arm member is disposed at said throwing position and at the other one of said ends of said slide slot when said bail arm member is disposed at said winding position;

whereby, a sound is generated when said ball moves into either of said ends of said slide slot.

3. The fishing reel as claimed in claim 1, wherein said first bail-supporting portion of said rotating wheel unit includes an accommodating space formed therein, an opening that is communicated with aid accommodating space, and annular flange that defines said opening therein, and a cap that is press fitted within said flange, said positioning spring unit being disposed within said accommodating space in said first bail-supporting portion of said rotating wheel unit.

* * * * *